US009529694B2

(12) United States Patent
Srivastava et al.

(10) Patent No.: US 9,529,694 B2
(45) Date of Patent: Dec. 27, 2016

(54) TECHNIQUES FOR ADAPTIVE TRACE LOGGING

(75) Inventors: Deepti Srivastava, San Francisco, CA (US); Wilson Chan, San Mateo, CA (US); John Hsu, Sunnyvale, CA (US); Eugene Ho, Fremont, CA (US); Tolga Yurek, Foster City, CA (US); Beverly Zane, Munich (DE); Angelo Pruscino, Los Altos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1213 days.

(21) Appl. No.: 12/559,338

(22) Filed: Sep. 14, 2009

(65) Prior Publication Data

US 2011/0067008 A1 Mar. 17, 2011

(51) Int. Cl.
*G06F 9/44* (2006.01)
*G06F 11/36* (2006.01)
*G06F 11/34* (2006.01)

(52) U.S. Cl.
CPC ....... *G06F 11/3636* (2013.01); *G06F 11/3466* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,432,932 A | * | 7/1995 | Chen et al. | 718/103 |
| 5,692,111 A | * | 11/1997 | Marbry et al. | 358/1.15 |
| 5,699,495 A | * | 12/1997 | Snipp | 358/1.15 |
| 5,802,295 A | * | 9/1998 | Fukui et al. | 709/216 |
| 5,809,224 A | * | 9/1998 | Schultz et al. | 714/6.32 |
| 6,076,161 A | * | 6/2000 | Ho | 713/2 |
| 7,424,589 B1 | * | 9/2008 | Pliss et al. | 711/170 |
| 7,606,893 B2 | | 10/2009 | Petrov et al. | |
| 7,844,701 B2 | * | 11/2010 | Ramany et al. | 709/224 |

(Continued)

*Primary Examiner* — Henry Tsai
*Assistant Examiner* — Christopher Bartels
(74) *Attorney, Agent, or Firm* — Hickman Palermo Becker Bingham LLP (57) ABSTRACT

Techniques for adaptive trace logging include, in one embodiment, obtaining input data on trace logging behavior and computing resources used by trace logging. Based on the obtained input data, an adaptive trace logging module automatically takes action at runtime to reduce the amount of computing resources consumed by tracing logging. For example, the action taken may include decreasing a trace logging level of an executing software program to reduce the number of trace logging messages added to a trace log. In another embodiment, the techniques include detecting a condition of an executing software program that warrants a change to a trace logging level of the executing program. The adaptive trace logging module automatically changes the trace logging level of the executing program as-needed for the detected condition. For example, the adaptive trace logging module may increase the trace logging level of an executing program upon detecting a deadlock or other abnormal condition of the executing program. By automatically increasing the trace logging level upon detecting an abnormal condition, additional trace logging messages may be written to a trace log aiding diagnosis and troubleshooting of the condition.

27 Claims, 5 Drawing Sheets

(56) References Cited

U.S. PATENT DOCUMENTS

| | | | |
|---|---|---|---|
| 8,271,990 B2* | 9/2012 | De et al. | 718/104 |
| 2003/0090704 A1* | 5/2003 | Hansen | 358/1.15 |
| 2003/0187922 A1* | 10/2003 | Ohara | 709/203 |
| 2004/0205386 A1* | 10/2004 | Staiger | 714/6 |
| 2005/0111856 A1* | 5/2005 | Kawai | 399/8 |
| 2005/0216722 A1* | 9/2005 | Kim et al. | 713/2 |
| 2005/0235054 A1* | 10/2005 | Kadashevich | 709/223 |
| 2006/0077413 A1* | 4/2006 | Lum et al. | 358/1.13 |
| 2006/0255978 A1* | 11/2006 | Agarwala | 341/50 |
| 2007/0002355 A1* | 1/2007 | Kai | 358/1.13 |
| 2008/0005494 A1* | 1/2008 | Zimmer et al. | 711/152 |
| 2008/0140835 A1* | 6/2008 | Bradley et al. | 709/225 |
| 2008/0250195 A1* | 10/2008 | Chow et al. | 711/103 |
| 2008/0250276 A1* | 10/2008 | Martinez et al. | 714/47 |
| 2009/0077229 A1* | 3/2009 | Ebbs | 709/224 |
| 2009/0106741 A1* | 4/2009 | Dageville | G06F 11/3636 717/128 |
| 2009/0113430 A1* | 4/2009 | Riley | 718/101 |
| 2009/0271763 A1* | 10/2009 | Varma et al. | 717/114 |
| 2009/0303521 A1* | 12/2009 | Kumar | 358/1.15 |
| 2010/0125665 A1* | 5/2010 | Simpson | G06F 11/3409 709/224 |
| 2010/0125844 A1* | 5/2010 | Mousseau et al. | 718/1 |
| 2010/0325264 A1* | 12/2010 | Crowder et al. | 709/224 |
| 2011/0296411 A1* | 12/2011 | Tang et al. | 718/1 |

* cited by examiner

TECHNIQUES FOR ADAPTIVE TRACE LOGGING

FIELD OF THE INVENTION

The present invention relates to logging by computer systems, and more particularly, to adaptive trace logging by computer systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a computer system, trace logging is a form of computer logging useful for recording information about a software program's execution. The information recorded in a trace log is used by computer software programmers, computer system administrators, and other technical personnel to troubleshoot problems that occur during execution of software programs.

To enable trace logging by a software program, the source code of the program can be instrumented with trace logging calls to a trace logging module. When the code or a compiled version thereof is executed by a computer system, the trace logging calls cause trace logging messages to be written to a trace log where they can be analyzed by troubleshooting personnel. A trace logging message written to a trace log may indicate, for example, a state of the software program's execution at the time of the call or other useful information for troubleshooting the program's execution.

A trace logging call can specify a trace logging severity and a trace logging message as parameters to the call. Typically, the trace logging severity parameter indicates one severity in a range of tracing severity to associate with the message. An example range of tracing severity from most severe to least severe is: "Error", "Warning", "Notice", "Info", "Debug", and "Trace".

To filter the trace logging messages that are stored in a trace log, a trace logging module may be configured to operate according to an administrator-specified trace logging level. The administrator-specified trace logging level affects what trace logging messages passed as parameters to trace logging calls are stored in a trace log during execution of the software program. In response to receiving a trace logging call, to determine whether a trace logging message passed in the call should be added to a trace log, the trace logging module may compare the trace logging severity passed in the call with the administrator-specified trace logging level. Trace logging messages associated with a trace logging severity that is less severe that the trace logging level will not be stored in a trace log and trace logging messages associated with a trace logging severity equal to or greater than the trace logging level will be stored in a trace log.

However, administrator-specified trace logging levels offer the administrator with a limited choice. On the one hand, the administrator can configure the trace logging module with a trace logging level of relatively low severity such as, for example, "Info". This will cause the trace logging module to add a relatively large number of trace logging messages to a trace log than would otherwise be added if the trace logging level is set to a higher severity such as, for example, "Warning". A relatively low severity trace logging level may be used by the administrator to ensure that important trace logging messages are not missed if and when a problem occurs with the executing software program. However, setting a trace logging level to a relatively low severity in this way has several drawbacks. For one, excessive trace logging messages are added to trace log even when there is no problem occurring in the executing software program. When a problem does occur, the administrator must sift through the extraneous trace log messages in the trace log to find messages that are relevant to the problem at hand. For another, storing trace log messages in a trace log consumes computing resources such as disk space and CPU that are also needed by other operations of the executing software program. Thus, setting a trace logging level in this way may cause significant degradation in the computing performance of the executing software program noticeable to end-users.

On the other hand, the administrator can set the trace logging level to a relatively high severity such as, for example, Warning. Setting the trace logging level in this way may prevent significant degradation in computing performance, but at the expense of potentially missing important trace logging messages useful for debugging or diagnosing problems with execution of a software program.

What is needed, therefore, is trace logging techniques that do not cause significant performance degradation to executing software processes that compete with trace logging operations for scarce computing resources while at the same time capturing sufficient trace logging messages useful for troubleshooting problems with software program execution. In a more general sense, there is a need for techniques for adaptive trace logging.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques for adaptive trace logging are disclosed. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques in a computer system for adaptive trace logging include use of an adaptive trace logging module.

According to one technique, the adaptive trace logging module obtains input data about trace logging behavior and computing resources (e.g., disk space and CPU cycles) used by trace logging operations. This input data may include, for example, a number of trace log messages added to a trace log in a period of time (trace logging volume), an amount of storage space available on a non-volatile computer-readable storage medium that stores a trace log (available disk space), a latency of an operation comprising writing a trace log message to a trace log (trace logging operation latency), a size of a trace log (trace log size), or any other metric or combination of metrics suitable for determining trace logging's impact on available computing resources. Based on the input data, the adaptive trace logging module determines whether an action should be taken to reduce an amount of computing resources consumed by trace logging. In one embodiment, such determination is made by determining whether the input data exceeds threshold values. If the adaptive trace logging module determines that an action should be taken, the adaptive trace logging module takes action to reduce an amount of computing resources consumed by trace logging operations. Such action may include, for example, changing the trace logging level of an executing software program so as to reduce the number of trace logging messages added to a trace log. As another example, the adaptive trace logging module may temporarily store trace logging messages in a volatile computer memory in lieu of storing the messages on a non-volatile computer-readable storage medium such as a hard disk to reduce resource contention for the non-volatile computer-readable storage medium with other programs and processes.

According to another technique, the adaptive trace logging module detects a condition of an executing software program that warrants a change to a trace logging level of the executing software program. The adaptive trace logging module automatically changes the trace logging level of the executing program as-needed for the detected condition. For example, the adaptive trace logging module may increase the trace logging level of an executing program upon detecting a deadlock or other abnormal condition of the executing program. By automatically increasing the trace logging level upon detecting an abnormal condition, additional trace logging messages are added to a trace log aiding diagnosis and troubleshooting of the condition should it occur again.

With the techniques for adaptive trace logging disclosed herein, excessive consumption of computing resources by trace logging operations is automatically and adaptively avoided preventing other, perhaps more critical, programs and processes from being starved of computing resources by trace logging operations. Further, the techniques facilitate automatic and adaptive adjustment of trace logging levels in response to detecting abnormal runtime conditions in executing software programs. Thus, storage of excessive and extraneous trace log messages in trace logs can be avoided while still capturing sufficient trace logging messages for diagnosing abnormal conditions in executing software programs if and when they occur.

Adaptive Trace Logging Module

An adaptive trace logging module for performing the adaptive trace logging techniques described herein is introduced.

In contrast to typical trace logging modules, the adaptive trace logging module of the present invention, in at least one embodiment, is capable of automatically preventing over-consumption of computing resources by trace logging operations. Over-consumption of computing resources is prevented by obtaining input data on trace logging operations and computing resources affected by trace logging operations. In response to obtaining such input data, the adaptive trace logging analyzes the input data to determine whether action should be taken to prevent over-consumption of computing resources. If the adaptive trace logging module determines that action should be taken, the adaptive trace logging module takes appropriate action to reduce the impact that trace logging operations have on computing resources.

Figure 1:
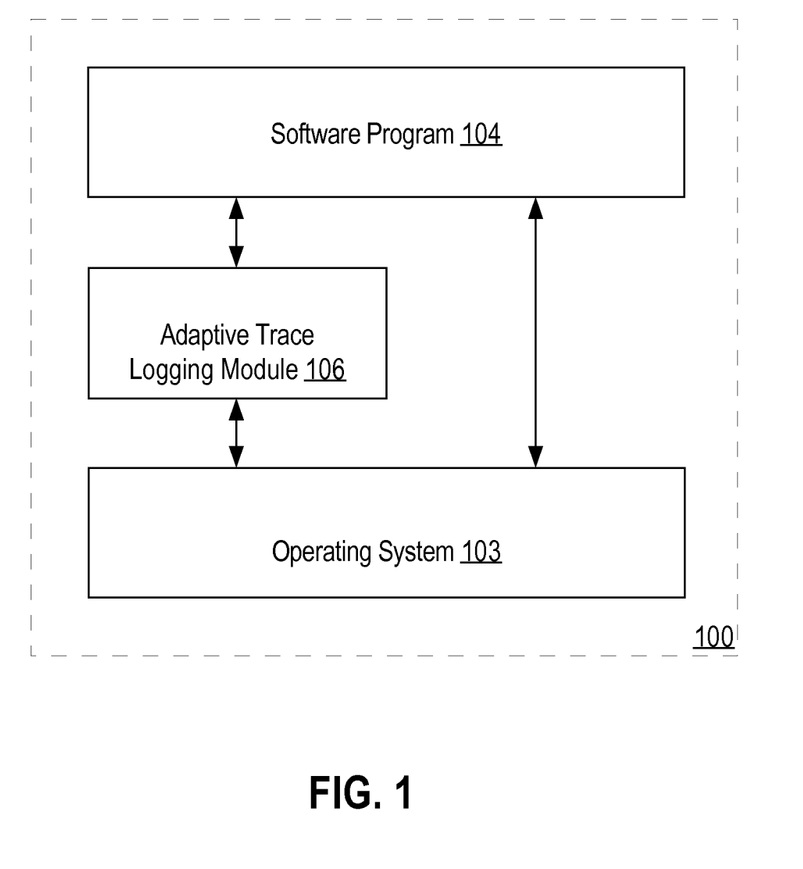
FIG. 1 is block diagram of a software hierarchy featuring an adaptive trace logging module.

The adaptive trace logging module of the present invention, in at least one embodiment, is capable of automatically changing a trace logging level of an executing software program in response to detecting a condition that warrants a change to the trace logging level of the executing software program. For example, in one embodiment, the adaptive trace logging module temporarily increases a trace logging level of an executing software program in response to detecting an abnormal condition in the executing software program. Temporarily increasing the trace logging level causes the executing software program to add more trace logging messages to a trace log. This aids in diagnosing and troubleshooting the abnormal condition should it occur again. In a related embodiment if, after some period of time after initially detecting the abnormal condition, the condition does not repeat or is no longer present in the executing software program, the adaptive trace logging module automatically deceases the trace logging level of the executing software program to a pre-abnormal condition level FIG. 1 is a block diagram of a software hierarchy 100 featuring an adaptive trace logging module 106. Software hierarchy 100 comprises a three-tier hierarchy including a computer operating system (layer) 103, an adaptive trace logging module (layer) 106, and a software program (layer) 104. When executing, the components of hierarchy 100 may be embodied in a computer system, such as computer system 500 of FIG. 5.

Operating system layer 103 broadly represents virtually any operating system that functions as an interface between hardware of a computing device and software programs executing on the computing device. These software programs can be said to be hosted by operation system layer 103. Operating system layer 103 may offer a set of services to executing software programs for interacting with hardware of the computing device through an Application Programming Interface (API), a system call interface, and the like. Such services provided by operating system layer 103 may include, for example, filesystem services for accessing a filesystem of the computing device and networking services for communicating with other computing devices connected to the computing device via a data network. Examples of commercially available and freely available operating systems suitable for functioning as operating system layer 103 include the Microsoft Windows™ family of operating systems available from the Microsoft Corp. of Redmond, Wash.; the Solaris Operating System available from the OpenSolaris website at www.opensolaris.com; the Linux Operating System and distributions thereof; and the MAC OS X operating system available from Apple, Inc. of Cupertino, Calif.

Software program 104 broadly represents virtually any set of computer-executable instructions capable of execution by a computing device with the aid of operating system layer 103. Software program 104 may be executed as one or more processes managed by operating system layer 103. Non-limiting examples of software program 104 include a web server, an application server, a database server, a word processing application, and a web browsing application.

The set of computer-executable instructions of software program 104 may be derived by a compiler from a humanreadable form of the software program known as source code. Alternatively, the set of computer-executable instructions may be executed directly by a computing device with the aid of an interpreter. Still further, the set of computer-executable instructions may comprise a combination of compiled instructions and interpreted instructions.

Software program 104 may comprise one or more software modules. A used herein, the term "software module" refers broadly to a collection of software subroutines or classes, or any other modular collection of code and data such as, for example, a static library, a Java™ package, a dynamic library, and a Dynamic Link Library (DLL). Software modules of software program 104 may be statically linked together by a linker to form an executable image of software program 104 executable by a computing device. In addition, software modules of software program 104 may be dynamically loaded and, if necessary, dynamically linked, at runtime during execution of software program 104 by a dynamic loader or dynamic linker.

The software modules of software program 104 may have dependencies on one another that can be conceptually represented as a directed graph. For example, a query engine software module of a database server software program may comprise a query parsing software module for parsing and normalizing a database query, a query optimizer software module for choosing the most efficient execution plan for a query, and a query execution software module for executing the query against a database according to the chosen execution plan. When processing a query, the query engine module invokes the query parsing module, the query optimizer module, and the query execution module to process the query and thus, can be said to depend on those modules.

Dependencies between software modules can be conceptually represented as a directed graph in which the nodes of the graph represent software modules and a directed arrow between two nodes of the graph represents a dependency between two software modules. For example, the dependencies in the database server example can be conceptually represented as a directed graph with four nodes and three directed arrows, each arrow directing from the node that represents the query engine module to one of the other three nodes representing the query parsing module, the query optimizer module, and the query execution module. Dependencies between software modules of software program 104 can be represented in a computer using any number of well-known data structures and techniques such as, for example, a binary tree data structure.

During execution, software program 104 may invoke the services of adaptive trace logging module 106 by making one or more trace logging calls to adaptive trace logging module 106. Adaptive trace logging module 106 may provide services to software program 104 through an Application Programming Interface (API) or an inter-process communication mechanism such as, for example, a mechanism comprising a data network and a well-known data network protocol such as, for example, the Transmission Control Protocol/Internet Protocol (TCP/IP) or the User Datagram Protocol (UDP).

Adaptive trace logging module 106 may be statically linked or dynamically loaded or linked to software program 104 in which case adaptive trace logging module 106 executes as part of one or more processes executing software program 104. Alternatively, adaptive trace logging module 106 may execute as a process separate from a process executing software program 104, perhaps on a separate computing device on which software program 104 is executing.

During execution, software program 104 may make one or more trace logging calls to adaptive trace logging module 106. As such, software program 104 can be considered a caller and adaptive trace logging module 106 considered a callee. To invoke the services of adaptive trace logging module 106, software program 104 may be instrumented with one or more trace logging calls. Instrumentation may occur manually, in which case a software developer manually authors trace logging calls in the source code of software program 104. Instrumentation may also occur automatically, as part of source code compilation or when the source code of software program 104 is interpreted by an interpreter.

One or more parameters may be passed to a trace logging call. At a minimum, a severity indicator is passed. The severity indicator indicates the severity of the condition in the executing software program 104 that caused the trace logging call to be made. The severity indicator may be one in a pre-defined range of tracing severity. An example range of tracing severity from most severe to least severe is: "Error", "Warning", "Notice", "Info", "Debug", and "Trace".

The level of the severity indicator passed to a trace logging call depends on the condition in the executing software program resulting in the trace logging call and is often selected when the software program is instrumented. For example, the software developer of the query parsing module discussed above might author the module to test for certain error conditions during parsing of a query and make a trace logging call passing a severity indicator of "Error" in the event one of those certain error conditions arises. As another example, the developer might author the query parsing module to make a trace logging call with a tracing severity of "Info" after the module successfully parses a query. A trace logging call with a tracing severity of "Info" might be useful, for example, to gather metrics about the performance of a piece of software. For example, a trace logging call with a tracing severity of "Info" might be used to record the amount of time spent by the query parsing module successfully parsing a given query.

In addition to a severity indicator, a trace log message may also be passed as a parameter to a trace logging call. Generally, a trace log message provides an indication or short description of the condition that caused the adaptive tracing logging call to be made. For example, in the case of an error, the trace logging message may provide a short description of the error that occurred.

In addition to the severity indicator and a trace log message, a caller identifier may also be passed to the adaptive trace logging module as a parameter to a trace logging call. A caller identifier identifies the caller of the trace logging call. A caller identifier may identify the executing process making the trace logging call. In addition, the caller identifier may identify the software program making the trace logging call. Further, the caller identifier may identify the software module making the trace logging call. In one embodiment, adaptive trace logging module 106 uses a caller identifier to adapt trace logging behavior on a per-process, per-software program, and per-software module basis as described in greater detail below.

Instead of or in addition to a caller identifier passed as a parameter to an adaptive tracing logging call, adaptive trace logging module 106 may use other techniques to identify a caller. Such techniques may include, for example, invoking process and program identification services of operating system layer 103, type introspection, examining the call stack, or any other techniques in the art for identifying a caller of a software module.

Adaptive trace logging module 106 functions as an interface between software program 104 and a trace log (not shown) in which trace log messages are stored. A trace log is a computer log used for the primary purpose of troubleshooting, diagnosing, or debugging execution of software programs by those who develop, engineer, or create the software program.

In general, a trace log can be distinguished from other types of computer logs such as an event log based on content and intended audience. For example, messages stored in a trace log are generally intended for software developers and software engineers to aid in debugging and fixing problems with software programs. In contrast, messages in an event log are generally intended for system administrators or other end users of a software program. As another example, messages in a trace log generally provide low-level technical information about a software program's execution such as, for example, a call stack trace when an exception is thrown by the executing program. In contrast, messages in an event log tend to provide high level information related to outcomes of successfully completed end-user initiated operations. A trace log is often "noisy" in that may contain a large volume of messages in general and a large number of duplicate messages in particular, one message for each occurrence of event that occurred multiple times. In contrast, with event logs, there is often an effort to compress multiple occurrence of an event into a single message. Further, messages in an event log tend to conform to a standard format and are capable of being localized to a particular locale (e.g. localization of language). In contrast, relatively fewer limitations are placed on the format of trace logging messages and localization of trace logging message is rarely a concern.

When a software program invokes adaptive trace logging module 106 via a trace logging call, the adaptive trace logging module compares the severity indicator passed to the call against a current trace logging level maintained by the adaptive trace logging module. The outcome of the comparison determines whether adaptive trace logging module should add an entry to a trace log. An entry added to a trace log may comprise, for example, a timestamp, the severity indicator passed to the call, the trace logging message passed to the call, or any other information that might be useful to add to trace log.

The comparison made by the adaptive trace logging module between a passed severity indicator and a current trace logging level may be a simple comparison for equality (i.e., if the severity indicator and the current trace logging level are equal, then an entry is added to a trace log, otherwise no entry is added for the call).

In another embodiment, the comparison involves adaptive tracing logging module 106 determining, where within a range of tracing severity ranging from most severe to least severe, the severity indicator and the current trace logging level lie. If the severity indicator passed to the call indicates a severity that is equal in severity or more severe than the severity indicated by the current trace logging level, then the adaptive trace logging module adds an entry to a trace log for the call. On the other hand, if the severity indicator indicates a severity that is less severe than the current trace logging level, then the adaptive trace logging module does not add an entry to the trace log for the call.

As an example, a range of tracing severity from most severe to least severe might be "Fatal", "Error", "Warn", "Info", "Debug", and "Trace". If the current trace logging level is "Warn", then all tracing logging calls passing a severity indicator of "Fatal", "Error", or "Warn" will result in the adaptive trace logging module adding an entry to a trace log for each call. Conversely, the adaptive trace logging module would not add an entry to a trace log in response to receiving a logging call passing a severity indicator of "Info", "Debug", or "Trace". As demonstrated by the example, a trace logging level based on a range of tracing severity can be used by the adaptive trace logging module to filter what trace logging messages are added to a trace log and the amount of trace logging messages that are added to a trace log.

When a trace logging level is based on a range of tracing severity, adaptive trace logging module 106 can adjust a trace logging level to control the amount of trace logging messages added to a trace log. In general, when the adaptive trace logging module increases a trace logging level (i.e., from less severe to more severe), the number of trace logging messages subsequently added by the adaptive trace logging module to a trace log is reduced. Conversely, when the adaptive trace logging module deceases a trace logging level (i.e., from more severe to less severe), the number of trace logging messages subsequently added by the adaptive trace logging module to a trace log is increased. For example, when a trace logging level based on the above example range of tracing severity ("Fatal", "Error", "Warn", "Info", "Debug", and "Trace") is set at "Warn", the adaptive trace logging module will add to a trace log those trace log messages passed in a trace logging call with a severity indicator of "Fatal", "Error", or "Warn". However, when the trace logging level is set to "Trace", the adaptive trace logging module will add all trace log messages passed to all trace logging calls. Thus, when a trace logging level is based on a range of tracing severity, the adaptive trace logging module can control the amount of trace log messages added to a trace log by increasing or decreasing a trace logging level.

Adaptive trace logging module 106 may maintain a current trace logging level on a global basis (i.e., for all software programs using the services of adaptive trace logging module 106), on a per-process basis, on a per-software program basis, on a per-software module basis, and on combinations thereof. Further, a current trace logging level of a sub-component may be used to override a current trace logging level of a higher level component. For example, a current trace logging level for a process may be used to override a global current trace logging level and a current trace logging level of a software module may be used to override a current trace logging level of a software program.

By maintaining a current trace log level on these various bases, adaptive trace logging module 106 can manage the number of trace logging messages added to a trace log with fine granularity. For example, if particular process or software program is making an excessive amount of trace logging calls resulting in an excessively large trace log, adaptive trace logging module can increase the current trace logging level of the particular process or particular software program to reduce the number of trace logging messages that are added to the trace log. As another example, if an abnormal condition is detected in a particular software module, the adaptive trace logging module can decrease the current trace logging level of the particular software module causing the number of trace logging messages related to the particular software module added to a trace log to increase.

Adaptive Trace Logging Module in a Cluster Environment

Figure 2:
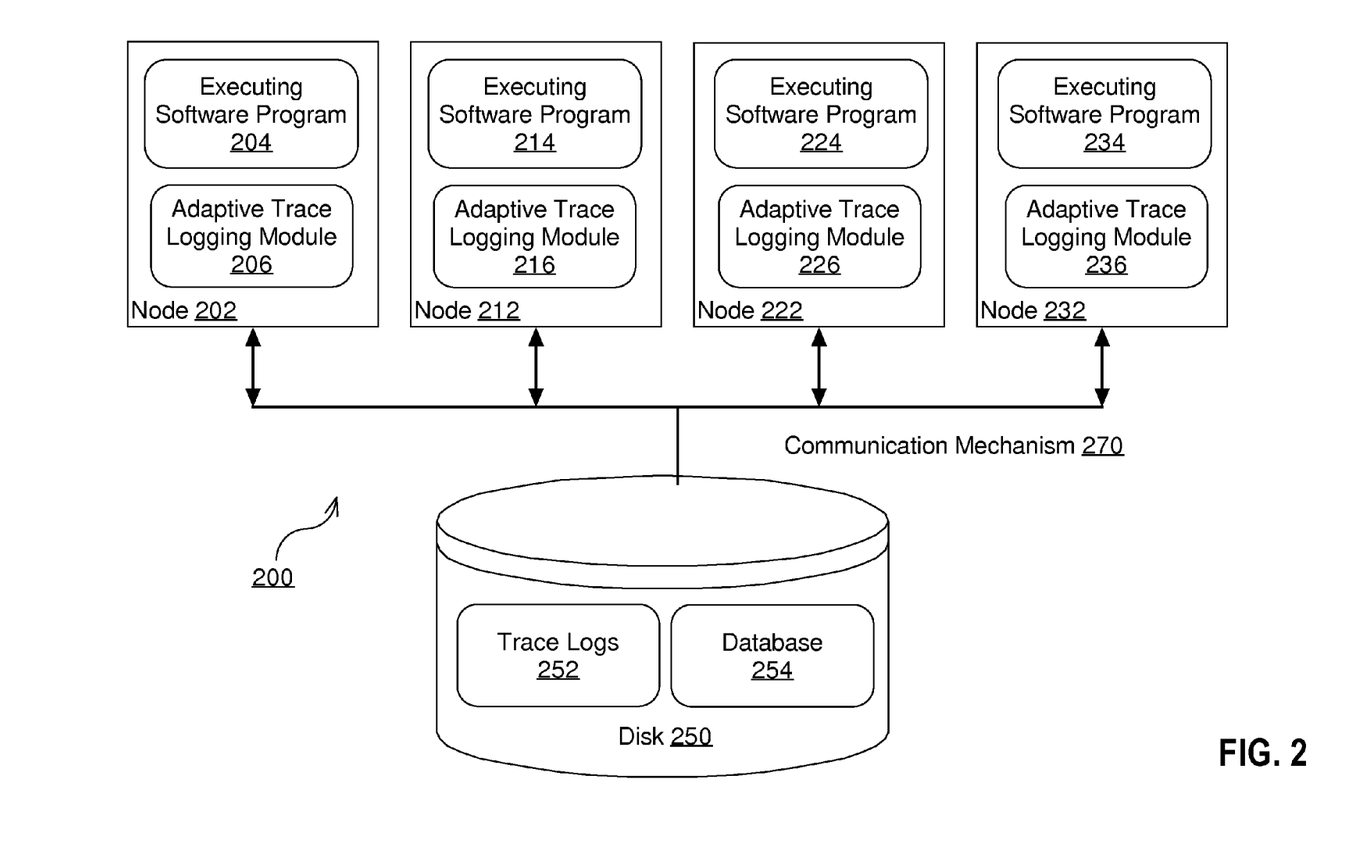
FIG. 2 is a block diagram of an exemplary multi-node computer system which utilizes techniques for adaptive trace logging.

FIG. 2 is a block diagram of a multi-node computer system 200 which utilizes techniques for adaptive trace logging. Each node has stored therein a software program and an adaptive trace logging module. Specifically, the illustrated system includes four nodes 202, 212, 222, and 232 on which reside executing software programs 204, 214, 224, and 234, respectively, and adaptive trace logging modules 206, 216, 226, and 236, respectively. In one embodiment, executing software programs 204, 214, 224, and 234 comprise a database server configured to operate as a cluster database. An example of a commercially available cluster database is the Oracle Real Application Server (RAC) available from the Oracle Corporation of Redwood Shores, Calif.

Executing software programs 204, 214, 224, and 234 have access to disk 250 on which database 254 and trace logs 252 are stored. Disk 250 generally represents one or more persistent storage devices which may be on any number of machines, including but not limited to the machines that contain nodes 202, 212, 222, and 232.

A communication mechanism 270 allows processes on nodes 202, 212, 222, and 232 to communicate with each other and with the disks that contain portions of trace logs 252 and database 254. The specific communication mechanism 270 between the nodes and disk 250 will vary based on the nature of system 200. For example, if the nodes 202, 212, 222 and 232 correspond to workstations on a network, the communication mechanism 270 will be different than if the nodes 202, 212, 222 and 232 correspond to clusters of processors and memory within a multi-processing machine.

Each of executing software programs 204, 214, 224, and 234 may be embodied in one or more processes executing on each of nodes 202, 212, 222, and 232. Each process may maintain a trace log on disk 250 through use of adaptive trace logging modules 206, 216, 226, and 236. In multi-node computing systems such as system 200, trace logs 252 may be used for triaging and diagnosing problems that occur with executing software programs 204, 214, 224, and 234. Trace logs 252 may also be used to diagnose problems across nodes 202, 212, 222, and 232 when clustered.

In a multi-node system such as system 200, typical trace logging modules can exacerbate a problem occurring at a node in the system, perhaps even to the point of causing the node to fail completely. For example, assume there is a substantial but not fatal problem with an I/O subsystem on node 212 of system 200 causing executing software program 214 to degrade in performance. This may result in executing software program 214 making more trace logging calls to a trace logging module with high levels of severity thereby causing the trace logging module to add more trace logging messages to a trace log. To add the trace logging messages to the trace log, the trace logging module may use the same I/O subsystem suffering the substantial but not yet fatal problem. Typical trace logging modules do not adjust trace logging levels or otherwise take preventive action to prevent trace logging operations from causing a node to fail. In the example scenario, a typical trace logging module would blindly attempt to add the additional trace logging messages to the trace log using the suffering I/O subsystem, perhaps even to the point of causing the I/O sub-system to fail completely. In essence, a typical trace logging module can act in a manner that is akin to a doctor taking an action that kills a sick but otherwise not terminal patient.

In contrast to typical tracing logging modules, an adaptive trace logging module of the present invention such as adaptive trace logging module 216 of node 212, embodies logic for controlling, moderating, and adapting trace logging behavior in accordance with pressure on computer resources. In one embodiment, the adaptive trace logging module adapts trace logging behavior by changing the volume and frequency of trace log messages added to a trace log by a node. For example, in one embodiment, the adaptive trace logging module increases a trace logging level to decrease the volume and frequency of trace log messages added to a log trace. In another embodiment, the adaptive trace logging module adapts trace logging behavior by changing the location, perhaps only temporarily, where trace logging messages are recorded. For example, the adaptive trace logging module may temporarily store trace logging messages in a volatile computer-readable memory to relieve resource contention for a non-volatile computer-readable storage medium such as a hard disk where trace logging messages are ordinarily stored.

Preventing Performance Degradation with Adaptive Trace Logging

Figure 3:
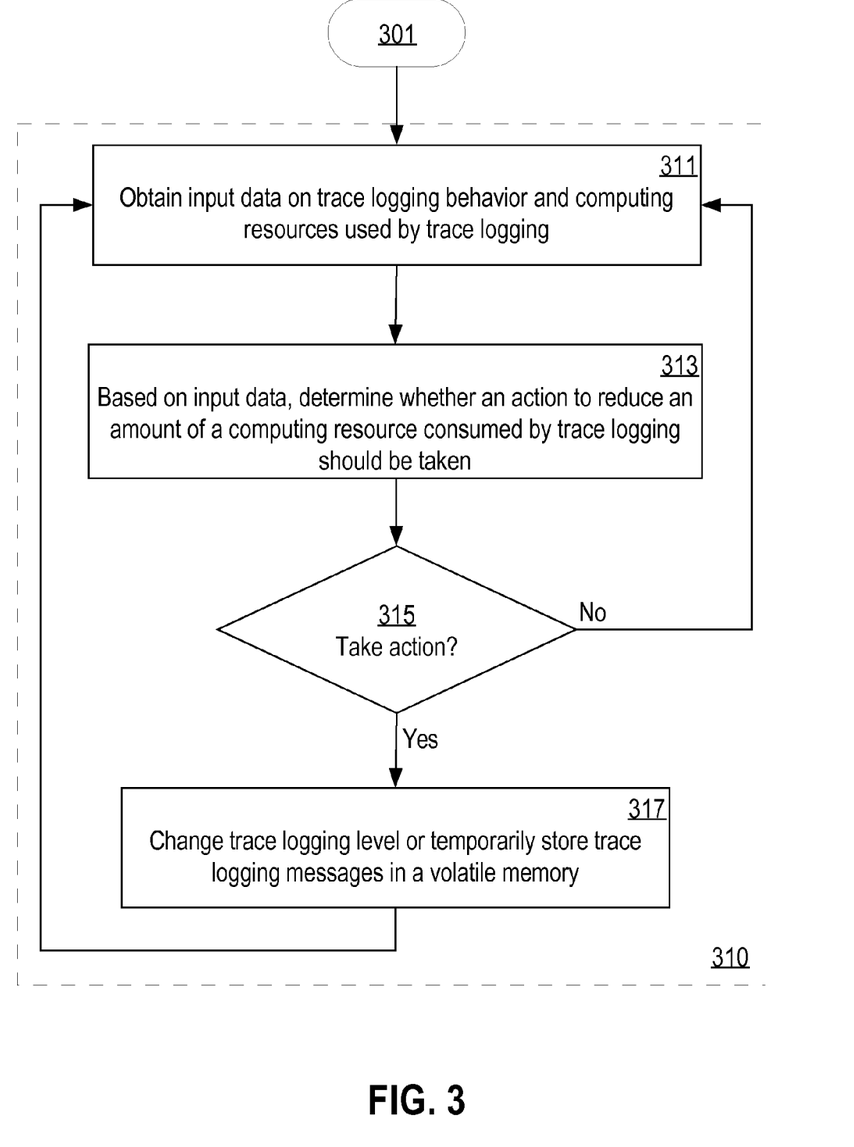
FIG. 3 is a flow diagram illustrating a method for adaptive trace logging.

FIG. 3 is a flow diagram illustrating a method for adaptive trace logging. In particular, FIG. 3 illustrates a process for preventing over-consumption of computing resources by trace logging operations using adaptive trace logging techniques according to an embodiment of the invention. In one embodiment, the process is performed by an adaptive trace logging module such as adaptive trace logging module 106 of FIG. 1 or adaptive trace logging modules 206, 216, 226, and 236 of FIG. 2.

The process of FIG. 3 begins at 301 whereupon a loop 310 comprising steps 311, 313, 315, and 317 is entered. At step 311, an adaptive trace logging module obtains input data on trace logging behavior and/or computing resources used by trace logging. As used herein, the term "computing resource" refers broadly to any virtual or physical component of finite availability within in a computer system. Examples of a computing resource within a computer system include Central Processing Unit (CPU) time, random-access memory (RAM), virtual memory, hard disk space, network throughput, electrical power, an external device connected to the computer system such as an audio device or a video device, and the like. Adaptive trace logging examples described herein generally refer to preventing over-consumption of CPU time and hard disk space resources. However, it should be understood that the techniques for adaptive trace logging disclosed herein are not limiting to preventing over-consumption of only those types of computing resources, and the techniques may be applied to prevent over-consumption of other types of computing resources.

At step 313, the adaptive trace logging module determines, based on the obtained input data, whether an action to reduce an amount of one or more computing resources consumed by trace logging should be taken. If no action is to be taken, that the process returns to step 311. If however, an action is to be taken, then the adaptive trace logging module in step 317 changes a trace logging level or temporarily changes the location where trace logging messages or stored.

Obtaining Input Data on Trace Logging Behavior and Computing Resources Used by Trace Logging In one embodiment, the adaptive trace logging module obtains input by maintaining a set of counters. The set of counters may be used by the adaptive tracing logging module to track tracing logging behavior over a period of time. The set of counters may track such information as a number of trace logging calls received, sizes of trace logging messages passed in trace logging calls, amounts of available disk space on a storage device where a trace log is stored, execution times of trace logging operations, and sizes of a trace log.

A number of trace logging calls received may be obtained by increasing a counter by one each time a trace logging call is received at the adaptive trace logging module.

Sizes of trace logging messages may be obtained by calculating the size of trace logging messages passed to the adaptive trace logging module in adaptive trace logging calls. The size of a trace logging message may be measured in terms of the number of bytes or bits used to represent the trace logging message in a computer, or any other suitable measurement.

Amounts of available disk space on a storage device where a trace log is stored may be obtained by periodically calculating the amount of available storage space on the storage device. In an embodiment, such calculation is performed by invoking a system call offered by an operating system such as operating system 103 of FIG. 1 that is capable of calculating the amount of free or available disk space on a specified storage device. Alternatively, the adaptive trace logging module may calculate an amount of available disk space by receiving an event or other notification when the storage device reaches a certain percentage of maximum storage capacity. Such notifications may be provided by an operating system or other application responsible for sending notifications to subscribers when a storage device reaches a specified percentage of maximum capacity.

Execution times of trace logging operations may be obtained by adaptive trace logging module by timing the duration of a trace logging operation. For example, before adding a trace logging message to a trace log the adaptive trace logging module starts a timer. After the add operation has completed and the trace logging message has been added to the trace log, the adaptive trace logging module stops the timer. The difference between the stop time and the start time is a measurement of the execution time of the add trace logging message operation.

Sizes of a trace log may obtained by periodically calculating the size of the trace log. In one embodiment, the size of a trace log is obtained by invoking a system call for calculating the size of the trace log offered by an operating system interface.

By maintaining the set of counters, the adaptive trace logging module can calculate trends and tendencies in trace logging behavior and consumption of computer resources over a period of time. For example, the adaptive trace logging module can determine a frequency of trace logging messages that are added to a trace log, a volume of trace logging messages that are added to a trace log, whether the available disk space on a storage device storing a trace log is increasing over time and the rate of increase, an average or median execution time of a trace logging operation, whether the execution time of a trace logging operation is increasing over time and the rate of increase, and the rate of increase in the size of a trace log.

The adaptive trace logging module may maintain a global set of counters. In addition or alternatively, the adaptive trace logging module may maintain a set of counters on a per-process basis, per-software program basis, per-software module basis, or some combination thereof in order to track trace logging behavior on a more fine-grained basis. In addition, the adaptive trace logging module may maintain a set of counters on a tracing severity basis in order to track certain aspects of tracing logging behavior such as, for example, trace logging frequency and trace logging volume, on a severity by severity basis. In one embodiment, the adaptive trace logging module uses a severity indicator passed to a trace logging calls to maintain a set of counters on a per-severity basis. Similarly, the adaptive trace logging module may use a caller identifier passed to a trace logging call or determined by the adaptive trace logging module to track trace logging behavior on a per-process, per-software program, and per-software module basis.

Determining Whether to Take Action to Reduce Trace Logging's Impact on Computing Resources In step 313, the adaptive trace logging module determines, based on the input data obtained in step 311, whether to take action to reduce an amount of one or more computing resources consumed by trace logging. In one embodiment, the adaptive trace logging module makes a decision whether to take action based on comparing obtained input data to threshold values. For example, if the frequency or volume of trace logging messages generated by a particular software module exceeds a threshold, then the adaptive trace logging module may determine to take action to reduce the frequency or volume of trace logging messages generated by the particular software module. As another example, if an amount of available disk space on a storage device storing a trace log falls below a threshold value or if a rate of consumption of available disk space is greater than a threshold rate, then the adaptive trace logging module may determine to take action to reduce trace logging's impact on the availability of storage space on the storage device. As yet another example, if a size of trace log file exceeds a threshold value, then the adaptive trace logging module may determine to take action to reduce the amount of trace logging messages added to the trace log.

In one embodiment, the threshold values are specified by an administrator. In another embodiment that is not exclusive of a threshold value specified by an administrator, the adaptive trace logging module determines a threshold value based on obtained input data. The adaptive trace logging module may set a threshold value only after obtaining a sufficient amount of initial input data upon which a reasonable threshold value can be calculated. The adaptive trace logging module may set threshold values on a global basis or, as with the set of counters described previously, on a per-process, per-software program, or pre-software-module basis. For example, the adaptive trace logging module may observe the number of trace logging calls by a particular software module over a period of time, thereafter the adaptive trace logging module may set a threshold trace logging frequency for the software module based on the frequency of trace logging messages observed for the period of time.

Using threshold values is but one of many possible techniques that the adaptive trace logging module can employ to determine whether to take an action to reduce an amount of computing resources consumed by trace logging and embodiments of the invention are not limited to using only threshold values. For example, the adaptive trace logging module may obtain input data that explicitly indicates that action should be taken and what action to take.

Taking Action to Reduce Trace Logging's Impact on Computing Resources

If, in step 315, the adaptive trace logging module determines that action should be taken, then the process of FIG. 3 proceeds to step 317. At step 317, the adaptive trace logging module takes action to reduce trace logging's impact on computing resources used by trace logging.

In one embodiment, to reduce trace logging's impact on computing resources, the adaptive trace logging module increases a trace logging level of a process, a software program, software module, or some combination thereof to reduce the number of trace logging messages that are added to a trace log. By increasing a trace logging level to reduce the number of trace logging messages added to the trace log, the adaptive trace logging module reduces the amount of storage space required to store the trace log and thus reduces trace logging's impact on computing resources.

In another embodiment, to reduce trace logging's impact on computing resources, the adaptive trace logging module temporarily adds incoming trace logging messages to a trace log stored in a volatile computer readable storage medium instead of adding the trace logging messages to a trace log stored in a non-volatile computer-readable storage medium. In general, data can be stored in a volatile computer-readable storage medium such as a Random Access Memory (RAM) or main memory more quickly than in a non-volatile computer-readable storage medium such as a hard disk. This discrepancy in storage efficiency results from the currently available technology used in the manufacture of non-volatile computer-readable storage media which generally does not operate as quickly as the technology comprising volatile computer-readable storage media.

In one embodiment, the trace log stored in the volatile computer-readable storage medium is implemented as a circular queue buffer. In this embodiment, upon determining that action should be taken to reduce trace logging's impact on computing resources, the adaptive trace logging adds trace logging messages to a circular queue buffer stored in a volatile computer-readable storage medium such the main memory of a computing device. By doing so, the adaptive trace logging module reduces the impact of trace logging operations on a non-volatile computer-readable storage medium where trace logging messages are normally stored while at the same time preserving the trace logging messages in a trace log where they can be examined by troubleshooting personnel.

In one embodiment, the adaptive trace logging module determines to add trace logging messages to a volatile computer-readable storage medium instead of a non-volatile computer-readable storage medium based on input data that indicates that the amount of available storage space on the non-volatile computer-readable storage medium is less than a threshold amount of available storage space. In another embodiment, the determination is based on input data that indicates that the latency of trace logging operations exceeds a latency threshold. In another embodiment, the adaptive trace logging module resumes adding trace logging messages to a trace log stored on a non-volatile computer-readable storage medium in response to obtaining input data that indicates that certain thresholds such as a threshold amount of available storage space or a latency threshold are no longer exceeded.

In other embodiments, the adaptive trace logging module may take other actions to reduce trace logging's impact on computing resources and the actions taken are not limited to changing a trace logging level or storing trace logging messages in a volatile computer-readable storage medium. For example, the adaptive trace logging module may add trace logging messages to a trace log in batches instead of adding trace logging messages to the trace log as trace logging calls are made.

If, in step 315, the adaptive trace logging module determines that an action should not be taken, then the process of FIG. 3 returns to step 311 where the adaptive trace logging module obtains further input data on trace logging behavior and computing resources used by trace logging. The loop 310 comprising steps 311, 313, 315, and 317 may be performed by adaptive trace logging module repeatedly and each time through the loop, at step 311, the adaptive trace logging module may obtain further input data regarding current trace logging behavior and current usage of computer resources. In this way, adaptive trace logging module can adapt trace logging behavior over time and as a computing conditions change.

Improving Troubleshooting of Software Programs with Adaptive Trace Logging

Figure 4:
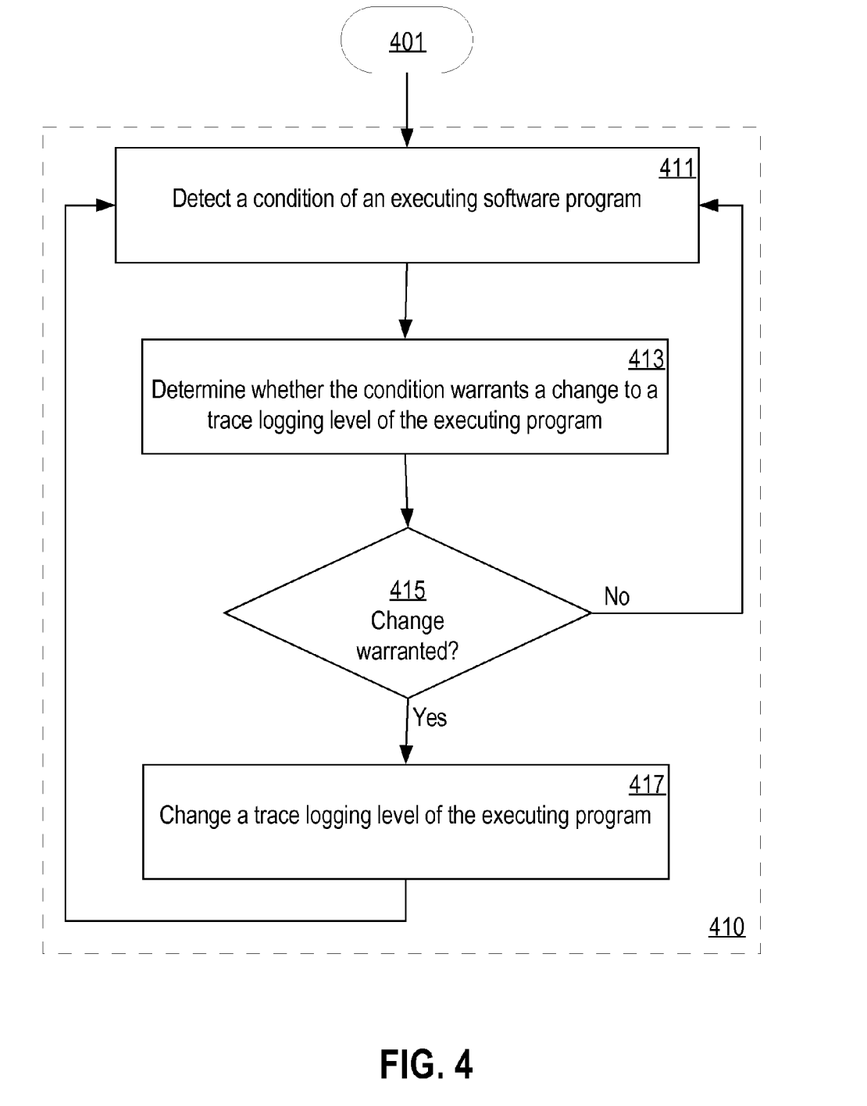
FIG. 4 is a flow diagram illustrating a method for adaptive trace logging.

FIG. 4 is a flow diagram illustrating a method for adaptive trace logging. In particular, FIG. 4 illustrates a process for improving troubleshooting of software programs using adaptive trace logging techniques according to an embodiment of the invention. In one embodiment, the process is performed by an adaptive trace logging module such as adaptive trace logging module 106 of FIG. 1 or adaptive trace logging modules 206, 216, 226, or 236 of FIG. 2.

The process of FIG. 4 begins at 401 whereupon a loop 410 comprising steps 411, 413, 315, and 417 is entered. At step 411, an adaptive trace logging module detects an abnormal condition of an executing software program. An abnormal condition is any detectable condition of an executing software program that warrants further scrutiny through increased trace logging.

An example of an abnormal condition is a deadlock condition. In general, a deadlock condition occurs when two or more processes are waiting for each other to release a resource such as a lock, and thus both will wait forever for each other to release the resource. For example, consider the multi-node environment of FIG. 2. If, for example, executing software program 204 is waiting for executing software program 214 to release a lock on a table of database 254, and executing software program 214 is also waiting for executing software program 204 to release the same lock, then a deadlock condition has occurred. There a variety of techniques known in the art for detecting various types of deadlock conditions.

While the process of FIG. 4 for improving troubleshooting of software programs using adaptive trace logging is explained by way of an example deadlock condition, it should be understood that embodiments of the invention are not limited to any particular type of detectable condition and embodiments of the invention can be used to improve troubleshooting of software programs based on virtually any detectable condition of an executing software program.

At step 411, the adaptive trace logging module may detect a condition of an executing software program through virtually any means for detecting the condition. In one embodiment, the adaptive trace logging module does not perform the initial detection of the condition. Rather, the adaptive trace logging module is notified, for example through an event mechanism, by another module, program, or process that performs the initial detection of the condition. For example, the multi-node environment 200 of FIG. 2 may be configured with a monitoring module, program, or process (not shown) that watches for and detects deadlock conditions that occur with executing software programs 204, 214, 224, and 234. Upon detection of a deadlock condition, the monitoring mode, program, or process may notify one or more of the adaptive trace logging modules 206, 216, 226, or 236 of the detected deadlock condition. Such notification may occur through a virtually any means capable of communicating the notification information to an adaptive trace logging module such as communication mechanism 260, an inter-process communication mechanism, a data network, or an intra-process inter-module function call.

In another embodiment, the executing software program initially detects the condition and notifies the adaptive trace logging module of the condition through a trace logging call.

At step 413, the adaptive trace logging module determines whether the detected condition warrants a change to a trace logging level of an executing software program. For example, assume a monitoring process in multi-node environment 200 of FIG. 2 detects a deadlock condition in executing software program 204. Upon detecting the deadlock conditions, the monitoring process notifies adaptive trace logging module 206 of the deadlock condition in executing software program 204. Upon receiving the notification of the deadlock condition, adaptive trace logging 206 determines whether the detected deadlock condition warrants a change to a trace logging level of executing software program 204.

Determining whether a detected condition warrants a change to a trace logging level of an executing software program can be based on virtually any criteria suitable for determining whether a trace logging level of the executing software program should be changed in response to detecting the condition. Such criteria will vary depending on the type of condition detected. Further such criteria may be specified by an administrator as part of configuring an adaptive trace logging module.

At steps 415 and 417, if the adaptive trace logging module determines that a change is warranted to a trace logging level of an executing software program, then the adaptive trace logging module changes a trace logging level of the executing software program. For example, if, upon receiving notification of a detected deadlock condition in executing software program 204, adaptive trace logging module 206 determines that a change to a trace logging level of executing software program 204 is warranted, adaptive trace logging module 206 may decease a trace logging level of executing program 204 say, for example, from "Warn" to "Debug", in order cause executing software program 204 to generate addition trace logging messages in trace log 252 that can be used by troubleshooting personnel to debug the deadlock condition.

In one embodiment, adaptive trace logging module changes a trace logging level for some but not all of the software modules that comprise an executing software program. Such targeted change of trace logging levels can be used to cause specific software modules of the executing software program that are suspected of being the source of the detected condition to generate additional trace logging messages while avoiding "noisy" trace logging messages from other software modules that are not suspected of being the source of the detected condition. The adaptive trace logging module may employ a software module dependency map or graph to change the trace logging level of a specific software module and software modules upon which the specific software module depends. For example, returning the query engine example above, upon detecting a deadlock condition in a query engine module, executing software program 204 may make a trace logging call to adaptive trace logging module 206 passing, among other things, a caller identifier identifying the query engine module as the caller of the trace logging call. Adaptive trace logging module 206 may use the caller identifier and a software module map to identify the software modules that the query engine module depends. For example, adaptive trace logging module 206 may identify a query parsing module, a query optimizer module, and a query execution module as software modules upon which the query engine module depends. The adaptive trace logging module 206 may then decrease the trace logging level of the query engine module, the query parsing module, the query optimizer module, and the query execution module causing the executing software program 204 to generate additional trace logging messages for those targeted software modules. In this embodiment, by targeting the trace logging levels of specific software modules instead of targeting a global trace logging level of the executing software program, the adaptive trace logging module ensures that additional trace logging messages added to a trace log are more relevant to the detected condition than would otherwise be the case if the trace logging level for entire executing software program (and hence all software modules) was decreased.

In one embodiment, the adaptive trace logging module tracks which trace logging levels were changed in response to detecting a condition and records. If the detected condition no longer occurs or subsides after a period of time, then the adaptive trace logging module returns the trace logging levels corresponding to the condition to their pre-changed setting. For example, adaptive trace logging module 206 may decrease a trace logging level of executing software program 204 from "Warn" to "Trace" upon detecting a deadlock condition in executing software program 204. Upon determining that the deadlock condition no longer persists or is no longer occurring in executing software program 204, adaptive trace logging module 206 may return the trace logging level to "Warn".

If, in step 415, the adaptive trace logging module determines that a change to a trace logging level of an executing software program is not warranted, then the process of FIG. 4 returns to step 411 where the adaptive trace logging module awaits detection of a condition in the executing software program. The loop 410 comprising steps 411, 413, 415, and 417 may be performed by adaptive trace logging module repeatedly and each time through the loop, at step 411, the adaptive trace logging module may detect a further condition of the executing software program. In this way, adaptive trace logging module can adapt trace logging behavior over time and as conditions in the executing software program occur.

With the techniques for adaptive trace logging disclosed herein, excessive consumption of computing resources by trace logging operations is automatically and adaptively avoided preventing other, perhaps more critical, programs and processes from being starved of computing resources by trace logging operations. Further, the techniques facilitate automatic and adaptive adjustment of trace logging levels in response to detecting abnormal runtime conditions in executing software programs. Thus, storage of excessive and extraneous trace log messages in trace logs can be avoided while still capturing sufficient trace logging messages for diagnosing abnormal conditions in executing software programs if and when they occur.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
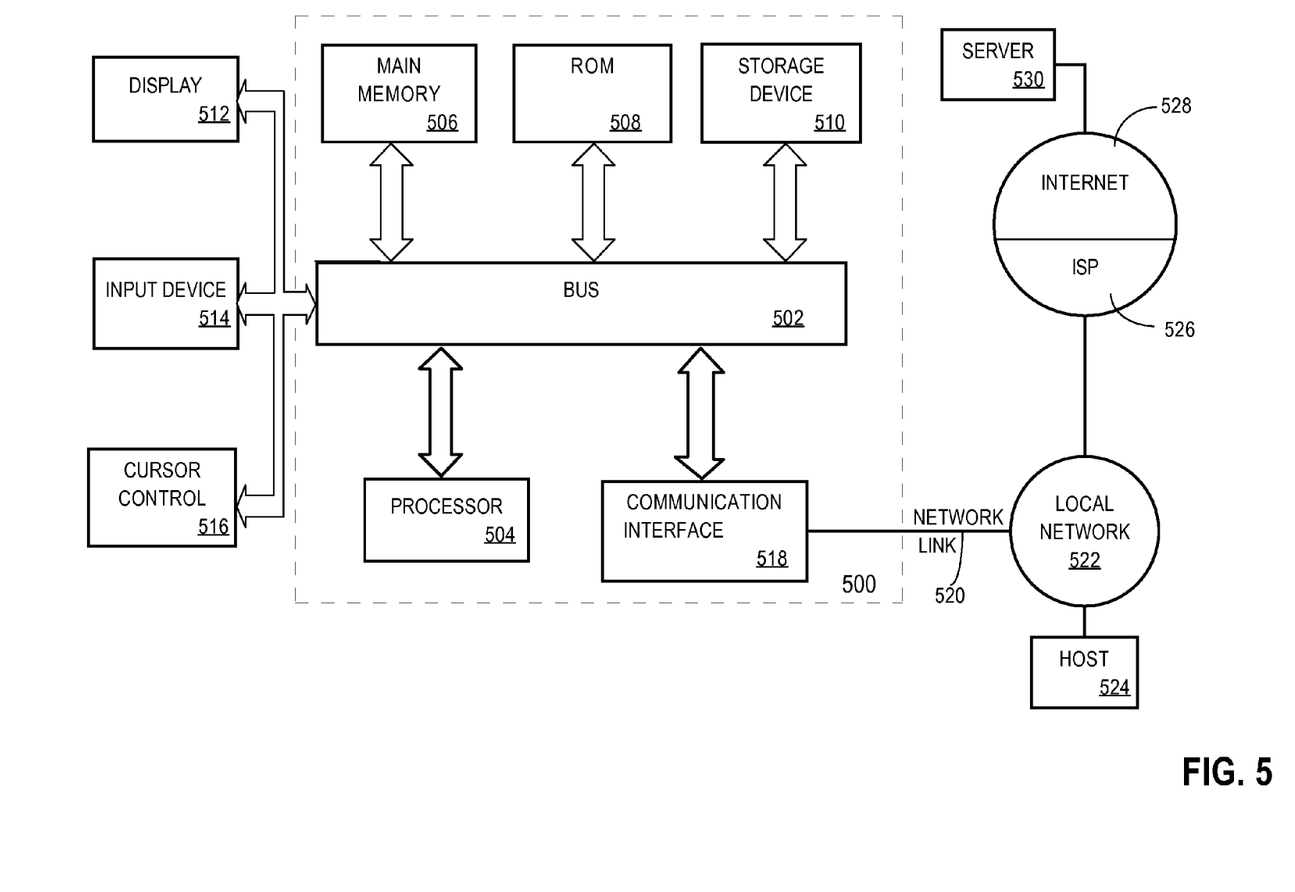
FIG. 5 is a block diagram of a computer system capable of supporting an embodiment of the invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

CONCLUSION

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for adaptive trace logging, comprising:
   generating, by execution of a software program, data that indicates an amount of computing resources consumed by trace logging and identifies at least one of the following:
   a number of trace logging messages added to a trace log in a period of time,
   an amount of storage space available on a non-volatile computer-readable storage medium that stores a trace log,
   execution time of a trace logging operation that writes a trace logging message to a trace log, and
   a size of a trace log;
      comparing, during execution of the software program, said data that indicates the amount of computing resources consumed by trace logging, to a set of one or more threshold values;
      based on said comparing, determining whether to perform an action to reduce the amount of computing resources consumed by trace logging for the software program; and
      performing said action by performing at least one of:
         changing a trace logging level to reduce a number of trace logging messages generated by execution of the software program that are written to the trace log, and
         changing a storage location for the trace logging messages generated by execution of the software program by writing a trace logging message to a volatile computer-readable storage medium instead of writing the trace logging message to a non-volatile computer-readable storage medium;
      after performing said action, continuing to write trace logging messages generated by execution of the software program in accordance with said action;
   wherein the method is performed by one or more computing devices.

2. The method of claim 1, wherein performing said action comprises changing a trace logging level.

3. The method of claim 2, wherein changing a trace logging level comprises decreasing the trace logging level.

4. The method of claim 2, wherein changing a trace logging level comprises changing a trace logging level of the software program.

5. The method of claim 2,
   wherein the software program is executing on a computing device and includes a plurality of software program modules; and
   wherein changing a trace logging level comprises changing a trace logging level of some but not all of the plurality of software program modules.

6. The method of claim 2,
   wherein a plurality of software programs is executing on a computing device; and
   wherein changing a trace logging level comprises changing a trace logging level of the plurality of software programs.

7. The method of claim 2,
   wherein the software program is executing on a plurality of computing devices; and
   wherein changing a trace logging level comprises changing a trace logging level of the software program.

8. The method of claim 1, wherein writing a trace logging message to a volatile computer-readable storage medium comprises
   writing a trace logging message to a circular queue buffer resident in a memory of a computing device.

9. The method of claim 1, wherein determining whether to perform an action to reduce an amount of one or more computing resources consumed by trace logging comprises determining whether at least one of the following threshold values is exceeded:
   a threshold value for the number of the trace logging messages,
   a threshold value for the amount of the storage space available,
   a threshold value for the execution time of a trace logging operation, and
   a threshold value for the size of the trace log.

10. The method of claim 9, further comprising in response to obtaining said data, adjusting one or more of the threshold values based at least in part on said data.

11. A method for adaptive trace logging in a cluster of computing nodes, comprising:
    receiving, from a cluster of software programs executing on the cluster of computing nodes, a plurality of trace logging messages;
    in response to receiving, from the cluster of software programs executing on the cluster of computing nodes, the plurality of trace logging messages, storing the trace logging messages in a set of one or more trace logs in persistent storage;
    detecting a condition of a particular software program, in the cluster of software programs, as the particular software program is executing on one of the nodes in the cluster of computing nodes;
    while the particular software program is executing on the node in the cluster of computing nodes:
       determining that the condition warrants a change to a first trace logging level of the particular software program in the cluster of software programs;
       changing the first trace logging level of the particular software program to capture information for debugging the detected condition of the particular software program in the cluster of software programs; and
       after changing the first trace logging level of the particular software program, writing one or more trace logging messages for the particular software program in the cluster of software programs in accordance with the changed trace logging level to a trace log that resides on a persistent storage device communicatively coupled to the computing nodes in the cluster;

wherein changing the first trace logging level of the particular software program in the cluster of software programs does not change a second trace logging level of a second software program in the cluster of software programs;

wherein the method is performed by one or more computing devices.

12. The method of claim 11, wherein changing a trace logging level comprises increasing the trace logging level of the executing software program.

13. The method of claim 12, wherein the executing software program is executing on a single computing device.

14. The method of claim 12, wherein the executing software program is executing on a plurality of computing devices.

15. The method of claim 12, wherein detecting a condition of an executing software program comprises detecting a deadlock condition of the executing software program.

16. One or more non-transitory computer-readable storage media storing instructions for adaptive trace logging, which when executed by one or more processors, cause:
generating, by execution of a software program, data that indicates an amount of computing resources consumed by trace logging and identifies at least one of the following:
a number of trace logging messages added to a trace log in a period of time,
an amount of storage space available on a non-volatile computer-readable storage medium that stores a trace log,
execution time of a trace logging operation that writes a trace logging message to a trace log, and
a size of a trace log;
comparing, during execution of the software program, said data that indicates the amount of computing resources consumed by trace logging, to a set of one or more threshold values;
based on said comparing, determining whether to perform an action to reduce the amount of computing resources consumed by trace logging for the software program; and
performing said action by performing at least one of:
changing a trace logging level to reduce a number of trace logging messages generated by execution of the software program that are written to the trace log, and
changing a storage location for the trace logging messages generated by execution of the software program by writing a trace logging message to a volatile computer-readable storage medium instead of writing the trace logging message to a non-volatile computer-readable storage medium;
after performing said action, continuing to write trace logging messages generated by execution of the software program in accordance with said action.

17. The one or more non-transitory computer-readable storage media of claim 16, wherein performing said action comprises changing a trace logging level.

18. The one or more non-transitory computer-readable storage media of claim 17, wherein changing a trace logging level comprises increasing a trace logging level.

19. The one or more non-transitory computer-readable storage media of claim 17,
wherein the software program is executing on a computing device; and
wherein changing a trace logging level comprises changing a trace logging level of the software program.

20. The one or more non-transitory computer-readable storage media of claim 17,
wherein the software program is executing on a computing device and includes a plurality of software program modules; and
wherein changing a trace logging level comprises changing a trace logging level of some but not all of the plurality of software program modules.

21. The one or more non-transitory computer-readable storage media of claim 17,
wherein a plurality of software programs is executing on a computing device; and
wherein changing a trace logging level comprises changing a trace logging level of the plurality of software programs.

22. The one or more non-transitory computer-readable storage media of claim 17,
wherein the software program is executing on a plurality of computing devices; and
wherein changing a trace logging level comprises changing a trace logging level of the software program.

23. The one or more non-transitory computer-readable storage media of claim 16, wherein writing a trace logging message to a volatile computer-readable storage medium comprises writing a trace logging message to a circular queue buffer resident in a memory of a computing device.

24. The one or more non-transitory computer-readable storage media of claim 16, wherein determining whether to perform an action to reduce an amount of one or more computing resources consumed by trace logging comprises determining whether at least one of the following threshold values is exceeded:
a threshold value for the number of the trace logging messages,
a threshold value for the amount of the storage space available on a non-volatile computer-readable storage medium that stores a trace log,
a threshold value for the execution time of a trace logging operation, and
a threshold value for the size of the trace log.

25. The one or more non-transitory computer-readable storage media of claim 24, the method further comprising in response to obtaining said data, adjusting one or more of the threshold values based at least in part on said data.

26. A computer system comprising:
one or more processors; and
logic of an adaptive trace logging module embodied in one or more computer-readable storage media for:
generating, by execution of a software program, data that indicates an amount of computing resources consumed by trace logging and identifies at least one of the following;
a number of trace logging messages added to a trace log in a period of time,
an amount of storage space available on a non-volatile computer-readable storage medium that stores a trace log,
execution time of a trace logging operation that writes a trace logging message to a trace log, and
a size of a trace log;

comparing, during execution of the software program, said data that indicates the amount of computing resources consumed by trace logging, to a set of one or more threshold values;

based on said comparing, determining whether to perform an action to reduce the amount of computing resources consumed by trace logging for the software program; and performing said action by performing at least one of:
- changing a trace logging level to reduce a number of trace logging messages generated by execution of the software program that are written to the trace log, and
- changing a storage location for the trace logging messages generated by execution of the software program by writing a trace logging message to a volatile computer-readable storage medium instead of writing the trace logging message to a non-volatile computer-readable storage medium;

after performing said action, continuing to write trace logging messages generated by execution of the software program in accordance with said action.

27. One or more non-transitory computer-readable storage media storing instructions, which when executed by one or more processors, cause:

receiving, from a cluster of software programs executing on a cluster of computing nodes, a plurality of trace logging messages;

in response to receiving, from the cluster of software programs executing on the cluster of computing nodes, the plurality of trace logging messages, storing the trace logging messages in a set of one or more trace logs in persistent storage;

detecting a condition of a particular software program, in the cluster of software programs, as the particular software program is executing on one of the nodes in the cluster of computing nodes;

while the particular software program is executing on the node in the cluster of computing nodes:
- determining that the condition warrants a change to a first trace logging level of the particular software program in the cluster of software programs;
- changing the first trace logging level of the particular software program to capture information for debugging the detected condition of the particular software program in the cluster of software programs; and
- after changing the first trace logging level of the particular software program, writing one or more trace logging messages for the particular software program in the cluster of software programs in accordance with the changed trace logging level to a trace log that resides on a persistent storage device communicatively coupled to the computing nodes in the cluster;

wherein changing the first trace logging level of the particular software program in the cluster of software programs does not change a second trace logging level of a second software program in the cluster of software programs.

* * * * *

UNITED STATES PATENT AND TRADEMARK OFFICE
CERTIFICATE OF CORRECTION

PATENT NO.       : 9,529,694 B2
APPLICATION NO.  : 12/559338
DATED            : December 27, 2016
INVENTOR(S)      : Deepti Srivastava et al.

It is certified that error appears in the above-identified patent and that said Letters Patent is hereby corrected as shown below:

In the Specification

Column 4, Line 26, change "level" to -- level. --

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*